United States Patent
Janardhanan et al.

(10) Patent No.: US 10,607,740 B2
(45) Date of Patent: Mar. 31, 2020

(54) SYSTEM, A DEVICE AND A METHOD FOR PASSIVE DECAY HEAT TRANSPORT

(71) Applicant: The Secretary, Department of Atomic Energy, Mumbai (IN)

(72) Inventors: Aparna Janardhanan, Mumbai (IN); Vijayan Krishnan Pallipattu, Mumbai (IN)

(73) Assignee: THE SECRETARY, DEPARTMENT OF ATOMIC ENERGY, Mumbai (IN)

( * ) Notice: Subject to any disclaimer, the term of this patent is extended or adjusted under 35 U.S.C. 154(b) by 245 days.

(21) Appl. No.: 15/517,077

(22) PCT Filed: Jan. 19, 2016

(86) PCT No.: PCT/IB2016/050235
§ 371 (c)(1),
(2) Date: Apr. 5, 2017

(87) PCT Pub. No.: WO2017/125782
PCT Pub. Date: Jul. 27, 2017

(65) Prior Publication Data
US 2018/0047465 A1 Feb. 15, 2018

(51) Int. Cl.
*G21C 15/257* (2006.01)
*G21C 1/10* (2006.01)
(Continued)

(52) U.S. Cl.
CPC ............... *G21C 1/10* (2013.01); *G21C 1/03* (2013.01); *G21C 5/02* (2013.01); *G21C 5/06* (2013.01);
(Continued)

(58) Field of Classification Search
CPC ... G21C 1/10; G21C 1/03; G21C 5/02; G21C 5/06; G21C 15/18; G21C 15/257
(Continued)

(56) References Cited

U.S. PATENT DOCUMENTS

2015/0243383 A1* 8/2015 Kwon .................. G21C 15/18
376/282
2016/0012924 A1* 1/2016 McClure ............. G21C 15/257
376/347
(Continued)

FOREIGN PATENT DOCUMENTS

WO 2014/176069 A2 10/2014

OTHER PUBLICATIONS

Los Alamos et al.: "Very Small Reactors for Rapid Deployment (2 to 1 MWe, Mobile Heat Pipe Cooled Fast Reactor)", Jan. 1, 2011 (Jan. 1, 2011), pp. 1-53, XP055233431, Retrieved from the Internet: URL:http://permalink.lanl.gov/object/tr?what=infor:lanl-repo/lareport/LA-UR-11-01990 [retrieved on Dec. 3, 2015].
(Continued)

*Primary Examiner* — Jack W Keith
*Assistant Examiner* — Daniel Wasil
(74) *Attorney, Agent, or Firm* — The Dobrusin Law Firm, P.C.; Bryan S. Lemanski

(57) ABSTRACT

In one implementation, a passive core decay heat transport system comprising of a device in the reactor core and an assembly of heat dissipating fins is disclosed. The device comprises at least one coolant channel 2 containing the fuel assembly 3; at least one collect joint 4 connecting the fuel in the assembly to shield plug 6; at least one liquid metal thermo-siphon 5 for transporting of decay heat from fuel; at least one other liquid metal thermo-siphon 7 for transport of heat from thermo-siphon 5; and at least an assembly of heat dissipating fins 10 for transport of heat from thermo-siphon 7 to ultimate sink. The thermal expansion of the liquid metal by melting establishes the conductive and convective heat transfer paths and transfers the heat from the fuel assembly 3 to the thermo-siphon 5, which transports the heat to other thermo-siphon 7 and then to the assembly of fin 10, which
(Continued)

dissipates the heat by natural circulation of air to atmospheric air.

14 Claims, 6 Drawing Sheets

(51) Int. Cl.
| | |
|---|---|
| *G21C 15/18* | (2006.01) |
| *G21C 5/02* | (2006.01) |
| *G21C 1/03* | (2006.01) |
| *G21C 5/06* | (2006.01) |
| *G21C 1/08* | (2006.01) |
| *G21C 13/028* | (2006.01) |
| *G21C 15/247* | (2006.01) |

(52) U.S. Cl.
CPC ........... *G21C 15/18* (2013.01); *G21C 15/257* (2013.01); *G21C 1/08* (2013.01); *G21C 13/028* (2013.01); *G21C 15/247* (2013.01); *Y02E 30/35* (2013.01)

(58) Field of Classification Search
USPC ......................................................... 376/405
See application file for complete search history.

(56) References Cited

U.S. PATENT DOCUMENTS

2016/0027536 A1* 1/2016 McClure ................. G21C 1/02
  376/277
2017/0287576 A2* 10/2017 Wattenburg .......... G21C 15/182

OTHER PUBLICATIONS

PCT Search Report & Written Opinion dated Oct. 14, 2016; Application No. PCT/IB2016/050235.

* cited by examiner

SYSTEM, A DEVICE AND A METHOD FOR PASSIVE DECAY HEAT TRANSPORT

TECHNICAL FIELD

The present subject matter described herein, in general, relates to the field of emergency cooling arrangements and more specifically relates to a design of a system, device and method for the shutdown system of a nuclear reactor for cooling the core by passive transport of decay heat through diverse molten metal coolant.

BACKGROUND

At present, light water reactor designs depend on the cooling capabilities of water at high pressures and temperatures. However, designs using water as coolant at high pressures have to account for the loss of coolant in the nuclear reactor, by breach in structural integrity. This is due to the increase in operating temperature of the coolant which results in increased boiling of the pressurized coolant, affecting the heat transfer, reactivity parameters and leads to instability issues in the reactor. In order to maintain the coolant state, the pressure needs to be increased which affects the structural integrity and leads to loss of coolant in the reactor. Thus, the management of the reactor core beyond a certain temperature depends on depressurizing and cooling, which currently involves external components and their availability.

Various systems of light water reactor designs are known in the prior art and a few of them are discussed below:

Pre-Pressurized Core Flooding Accumulators:

In this decay heat transport system are connected to primary heat transport system through check valves at pressures lesser than accumulator pressure in case of LOCA (Loss Of Coolant Accident) and inventory is sufficient for 15 minutes (Effective from 6% decay power depending on primary heat transport system pressure). It has a design capacity of 15 minutes. To achieve the said effect, it uses a significant number of other components such as high pressure accumulators, piping, isolation valves, instrumentation, which results in high density of components in the containment.

Core make-up tanks are available that are connected to primary heat transport system through valves to initiate natural circulation based on the design sequence and are effective for 6% decay power; having a design capacity of 3 days. It also uses numerable components such as tank inside the containment, piping, valves, instrumentation, resulting in high density of components in the containment.

Gravity drain tanks: system is connected to reactor primary coolant system through valves, only at low reactor pressure (Effective for 1% decay power depending on the primary heat transport system pressure). It has a design capacity of 3 days and uses components such as tank above the core elevation, piping, valves, instrumentation etc.

Passively Cooled Steam Generator Natural Circulation:

In this system is connected to steam generator by valves, actively or passively based on pressure (Effective for 6% decay power depending on primary heat transport system operation) and has low design capacity of one day, depending on the tank design capacity. It uses high number of components such as heat exchangers, water pool immersing the heat exchangers, piping, instrumentation etc.

Passively cooled Core Isolation condenser system connect to primary heat transport system through valves actively or passively. They are effective for 6% decay heat depending on the primary heat transport system pressure. The design capacity is more than 3 days and has components such as isolation condenser, water pool, piping, instrumentation etc., which leads to high density of the components in the containment.

Prior-art U.S. Pat. No. 4,608,224 A provides nuclear reactor cooled by a liquid metal. It teaches a shut-down heat exchanger means operable during reactor shut-down conditions and for establishing a thermal siphon effect. Further, it teaches a difference in level between reactor core (hot source) and exchangers (cold source), which aids the formation of a thermal siphon within the main reactor vessel, when the external circuits have been emptied into the latter. This feature, facilitates the cooling of the core by the thermal siphon effect.

In view of the above, a number of designs are known which are based on different concepts. Thermo-siphon cooling, heat transport by fins to air and liquid metal coolants are known in different nuclear reactor designs and industrial applications other than water cooled reactors. However, Fast reactors operate at temperatures above 500° C. and use liquid metal coolant compatible at high temperatures while water cooled reactors operate in thermal region of neutron spectrum by the moderating properties of water and operate at temperatures around 300° C., and at its saturation pressures.

All the above, decay heat removal systems existing in different reactor systems remove heat from the primary coolant only and not directly from the core. Decay heat removal in these system designs depend on the availability of primary coolant and integrity of the system to deliver intended functionality. Also, these systems require a large number of components, which increases the density of components in the containment.

Recent accidents in the Fukushima boiling water reactors (BWRs), Japan, established that there is a need for decay heat transport directly from the core in addition to the heat transport from the primary coolant. The severe accidents in water cooled reactors clearly indicate the necessity of core decay heat transport at high temperatures beyond water cooling, for ultimate safety of the core.

Present water cooled reactor designs incorporate saturated water in single or two-phase as their primary heat transport medium and the heat transfer to the main heat sink, is mainly achieved due to fluid to fluid conduction and convection modes of heat transfer away from the core. In the accident scenarios, such as that of Fukushima, the core suffers the absence of intended heat sink and poor heat transfer at high temperatures in addition to other influence vectors. Hence to contain the accident conditions beyond the high pressure water based heat transport, a diverse passive decay heat transport mechanism is needed. Hence, it is desirable to have a system, device and method for water cooled reactors that transports decay heat directly from the fuel to ultimate heat sink.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An object of the present invention is to provide a design of system, device and method for transport of decay heat directly from the fuel to ultimate heat sink.

Another object of the present invention is to provide a system, device and method for improved passive shutdown cooling system for a nuclear reactor without short term reliance on electrical supplies, service water and operator action by utilizing natural convection circulation of coolant.

Yet another object of the present invention to provide a system, device and method for transport decay heat directly from the fuel to ultimate heat sink, the atmospheric air, using diverse liquid metal coolant in multiple closed thermo-siphons and heat dissipating fins.

Yet another object of the present invention is to provide a system, device and method which is capable to limit the core temperatures well below the exothermic Zr (Zirconium)-Water reactions.

Yet another object of the present invention is to design a system for decay heat removal, by direct transport of heat from the fuel to atmospheric air, the ultimate heat sink, passively, independent of reactor systems, without any active external input or power.

Still another object of the present invention to provide a device that transports 1% decay heat to atmospheric air and will be effective from seconds after shut down.

Accordingly, in one implementation, a passive core decay heat transport system comprising of a device in the reactor core and an assembly of heat dissipating fins is disclosed. The device comprises at least one coolant channel containing the fuel assembly; at least one collet joint connecting the fuel in the assembly to shield plug; at least one liquid metal thermo-siphon for transporting of decay heat from fuel; at least one other liquid metal thermo-siphon for transport of heat from thermo-siphon; and at least an assembly of heat dissipating fins for transport of heat from thermo-siphon to ultimate sink. The thermal expansion of the liquid metal by melting establishes the conductive and convective heat transfer paths and transfers the heat from the fuel assembly to the thermo-siphon, which transports the heat to other thermo-siphon and then to the assembly of fin, which dissipates the heat by natural circulation of air to atmospheric air.

In one implementation, a passive core decay heat transport device is disclosed. The device comprises at least one lower end fitting means coupled to a fuel assembly producing heat; at least one coolant channel containing the fuel assembly surrounded by primary water coolant to cool the fuel; at least one collet joint connecting the fuel in the assembly to shield plug; at least one liquid metal thermo-siphon for transport of heat; at least one shield plug for radiation shielding and flow guide in the coolant channel; at least one other liquid metal thermo-siphon for transport of heat; at least one seal plug for pressure sealing the coolant channel; and coupled to at least an assembly of heat dissipating fins. The seal plug comprises at least one collet joint coupled to the other liquid metal thermo-siphon. The fuel assembly conducts the decay heat to thermo-siphon 5 using conductive and convective heat transfer modes, which transports the heat to other thermo-siphon and then to the assembly of fin, which results in cooling by natural circulation of air in closed circuit through the heat transport path to atmospheric air.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Figure 1:
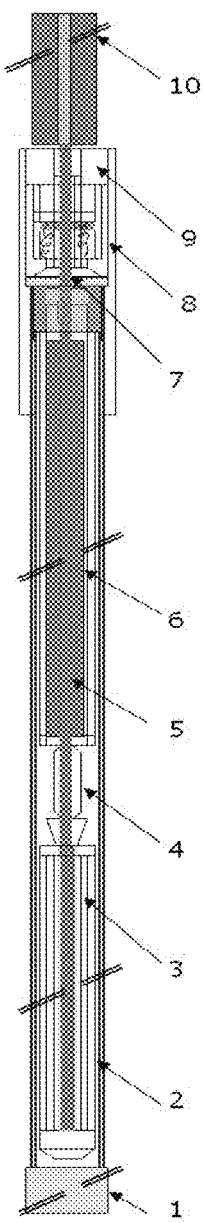
FIG. 1 illustrates in a schematic representation the passive decay heat transport system and device, in accordance with an embodiment of the present subject matter.
Figure 2:
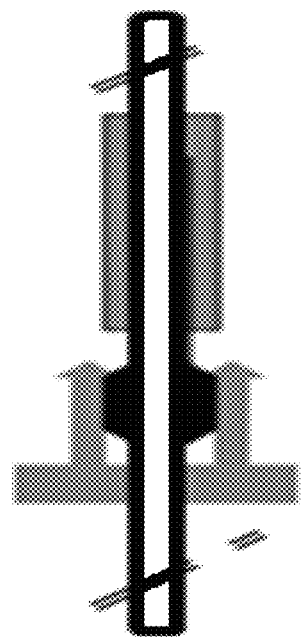
FIG. 2 illustrates the collet joint of the device, in accordance with an embodiment of the present subject matter.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

In one implementation, the present invention provides a design of system, device and method for transport decay heat directly from the fuel to ultimate heat sink.

In one implementation, the present invention provides a design of system, device and method for transport decay heat directly from the fuel to ultimate heat sink, the atmospheric air, using diverse liquid metal coolant in multiple closed thermo-siphons and heat dissipating fins.

In one implementation, the present invention provides a design of system and device for passive decay heat transport during failure of the cooling function of primary water coolant by providing a diverse coolant in multiple closed thermo-siphon devices and decay heat transport to the ultimate heat sink, the atmospheric air.

In one implementation, the present invention provides a design of system and device for decay heat removal, by direct transport of heat from the fuel to atmospheric air, the ultimate heat sink, passively, independent of reactor systems, without any active external input or power.

In one implementation, the present invention provides a device to transport decay heat directly from the fuel passively to atmospheric air, instead of heat transport from primary coolant.

In one implementation, the present invention provides a system, device and method that uses diverse core cooling and limits core temperatures below the exothermic Zr-water reactions.

In one implementation, the present invention provides a system, device and method capable of transporting 1% decay heat to atmospheric air and will be effective from 5000 seconds after shut down.

In one implementation, the present invention provides a passive core decay heat transport system transporting heat directly from the reactor core itself, using diverse liquid metal coolant such as lead in multiple closed thermo-siphons, dissipating decay heat directly to ultimate heat sink, the atmospheric air and provides ultimate safety to the core.

In one implementation, a design of a passive core decay heat transport system comprising of a device in the reactor core and an assembly of heat dissipating fins is disclosed. The device comprises at least one coolant channel 2 containing the fuel assembly 3; at least one collet joint 4 connecting the fuel in the assembly to shield plug 6; at least one liquid metal thermo-siphon 5 for transporting of decay heat from fuel; at least one other liquid metal thermo-siphon 7 for transport of heat from thermo-siphon 5; and at least an assembly of heat dissipating fins 10 for transport of heat from thermo-siphon 7 to ultimate sink. The thermal expansion of the liquid metal by melting establishes the conductive and convective heat transfer paths and transfers the heat from the fuel assembly 3 to the thermo-siphon 5, which transports the heat to other thermo-siphon 7 and then to the assembly of fin 10, which dissipates the heat by natural circulation of air to atmospheric air. The collet joint 4 has expandable fingers, which slide outwards to receive the component and snap tight around the contour of the component to be held.

In one implementation, the present invention provides a system design which limits the core temperatures below the exothermic Zr-Water reactions capable of releasing hydrogen. This design employs self-managed passive system design which do not need any external inputs for its functioning.

In one implementation, the present invention provides a device that uses diverse liquid metal coolant to transport decay heat directly from the fuel to the ultimate heat sink, the atmospheric air. This happens passively for long durations and safely, irrespective of other heat transport systems and availability of external power supply.

In one implementation, a passive core decay heat transport device is disclosed. The device comprises at least one lower end fitting means 1 coupled to a fuel assembly 3 producing heat; at least one coolant channel 2 containing the fuel assembly 3 surrounded by primary water coolant to cool the fuel; at least one collet joint 4 connecting the fuel in the assembly to shield plug 6; at least one liquid metal thermo-siphon 5 for transport of heat; at least one shield plug 6 for radiation shielding and flow guide in the coolant channel 2; at least one other liquid metal thermo-siphon 7 for transport of heat; at least one seal plug 9 for pressure sealing the coolant channel 2; and coupled to at least an assembly of heat dissipating fins 10. The seal plug 9 comprises at least one collet joint coupled to the other liquid metal thermo-siphon 7. The fuel assembly 3 conducts the decay heat to thermo-siphon 5 using conductive and convective heat transfer modes, which transports the heat to other thermo-siphon 7 and then to the assembly of fin 10, which results in cooling by natural circulation of air in closed circuit through the heat transport path 14, 15, 16, 17 and 18 to atmospheric air.

In one implementation, the present system, device provides for tapping of decay heat as a power source for handling Station Black Out (SBO) conditions in nuclear reactors using Sterling engines and thermos-electric modules. In addition, the present invention provides for a radical change in treating the decay heat, as source of power to handle extended Station Black Out situations, instead of viewing decay heat as a safety challenge In one implementation, the present invention provides a system, device that transports 1% decay heat to atmospheric air and may be effective from seconds after shut down. The device is capable of transporting 1% decay heat to atmospheric air and will be effective from 5000 seconds after shut down.

Referring now to FIG. 1 illustrating the schematic representation of the passive decay heat transport system and device. Part-1 indicates the lower end fitting of a typical fuel assembly transitioning to the coolant channel in the core. Part 2 indicates the coolant channel in the core containing the fuel assembly surrounding which the primary water coolant flows to cool the fuel. Part 3 indicates the fuel assembly inside the coolant channel. Part 4 is the collet joint connecting the fuel to the shield plugs. Part 5 is the liquid metal thermo-siphon. Part 6 is the shield plug which serves the purpose of radiation shielding and as a flow guide inside the coolant channel. Part 7 is the second transition liquid metal thermo-siphon. Part 8 is the top end fitting. Part 9 indicates the seal plug which acts as a pressure seal to the coolant channel and has a collet joint for part 7. Part 10 is the assembly of heat dissipating fins.

Figure 5:
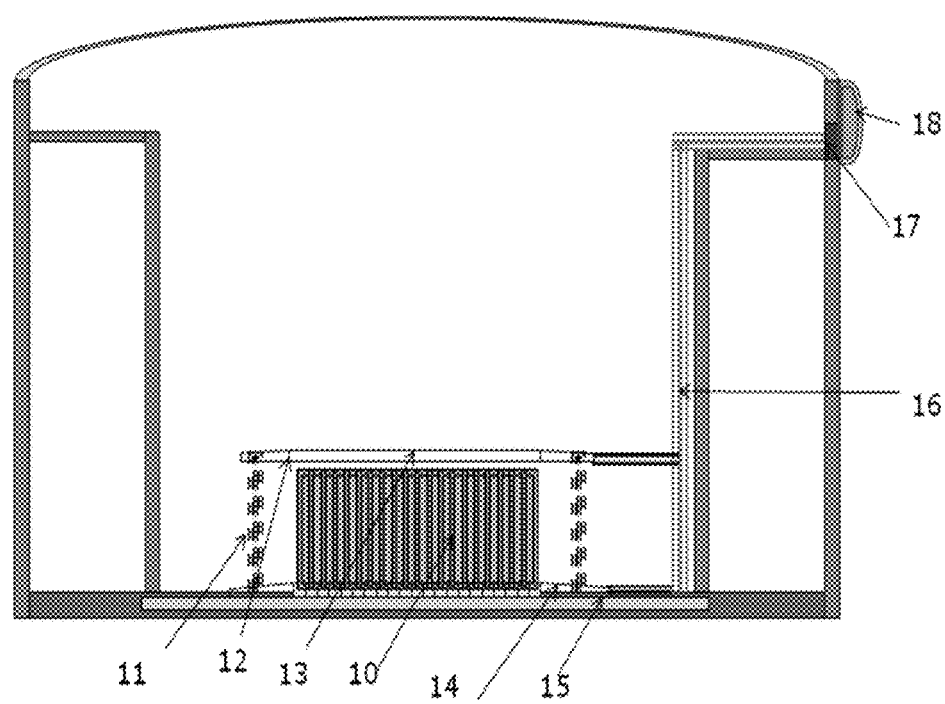
FIG. 5 illustrates the arrangement for the movement of hot air from the fins being cooled in ducts exposed to atmospheric air of the system, in accordance with an embodiment of the present subject matter.
Figure 6:
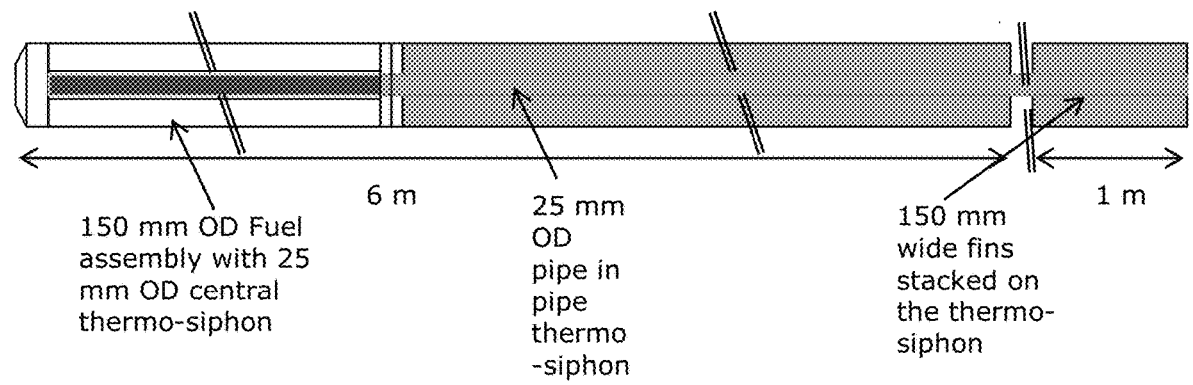
FIG. 6 illustrates the calculations involved in working the system, in accordance with an embodiment of the present subject matter.

Referring now to FIG. 5 illustrates the hot air from the fins being cooled in ducts exposed to atmospheric air outside the reactor building. This arrangement ensures the heat transport path without any mass transport from within the reactor. Part 11 represents the isolation enclosure of the fins above the seal plugs in reactor closure deck. Part 12 facilitates communication to external air for cleaning and initiating the system. Part 13 indicates facility for fuelling access in the top cover plate. Part 14 is the flow guide for cool air to the fins. Part 15 is the inlet duct to the fins. Part 16 is the inlet and outlet ducts. Part 17 is the embedded projections in the containment. Part 18 is the air cooling duct structure surrounding the containment for cooling the hot air from the fins. This duct is connected to part 16 for closed circulation of air by natural circulation.

In one implementation, a diverse passive decay heat transport mechanism is provided using lead thermos-siphons in the core, as a diverse molten metal coolant to take over as a heat sink in a diverse mechanism of multiple closed thermo-siphons.

In one implementation, a passive core decay heat transport method is disclosed. The method for passive core decay heat transport comprising of: melting of the molten metal due to rise in temperature of the fuel above the melting point of the metal; activation of heat transport path due to the melting the metal; transfer of heat by conduction and convective heat transfer path between fuel assembly 3, collet joint 4, liquid metal thermo-siphon 5 and other liquid metal thermo-siphon 7; transfer of heat from the other liquid metal thermo-siphon 7 to the assembly of heal dissipating fins 10; transfer of heat from hot air from the fins to the ultimate sink, atmospheric air.

Figure 3:
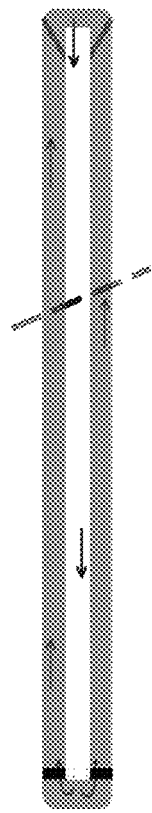
FIG. 3 illustrates the liquid metal thermo-siphon of the device, in accordance with an embodiment of the present subject matter.
Figure 4:
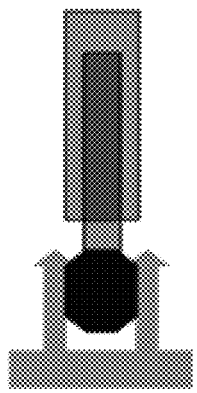
FIG. 4 illustrates the other liquid metal thermo-siphon of the device, in accordance with an embodiment of the present subject matter.

Referring now to FIGS. 3 and 4, which illustrate the thermos-siphon 5 and 7 respectively, in accordance to the present invention. The thermo-siphons 5 and 7 are pipe in pipe annular devices connected at the top and bottom for fluid circulation. Core decay heat acts as heat source and atmospheric air acts as heat sink for the thermo-siphons. The fluid in the outer annulus gets heated by the decay heat from the fuel, and becomes relatively lighter compared to the liquid metal in the inner annulus. This establishes a density gradient and establishes a flow and heat transport inside the thermo-siphon. The hot and lighter fluid raises in the outer annulus and gets cooled at the top cooler end. The cooled fluid being heavy flows down through the inner annulus, gets heated and raises in the outer annulus. The flow of fluid thus is established between the heat source and the heat sink by thermal gradients. Thermo-siphon functionality is influenced by the requirements of passive cooling, driving heads and thermal gradients.

During a severe accident scenario of loss of cooling of the fuel by the primary coolant, part 3 conducts the decay heat to part 5 using conductive and convective heat transfer modes. Part 5 transports the heat to part 7. Part 6 is intended to be solid material and as an alternative filled with liquid metal. Part 7 transports the heat to part 10. Part 10 is cooled by natural circulation of air in closed circuit through the heat transport path by parts 14, 15, 16, 17 and 18 to atmospheric air. The heat transport path is activated when the fuel temperature exceeds the melting point of the molten metal. The thermal expansion of the liquid metal by melting establishes the conduction and convective heat transfer path between part 3, part 4, part 5 and part 7. During normal operation this heat transport route is not active and the fin temperatures are as that of the seal plug. The heat transport path is activated during accidents leading to increased fuel temperatures, such as loss of primary cooling and core melt conditions. All the parts of the system are sequential and operate passively and are self-managed by the temperature differential across them.

In one preferred implementation, the molten metal coolant is lead. Lead is a core compatible metal and has a melting point above the normal operating temperatures of the reactor coolant. It provides a smooth transition in heat transfer from water to molten metal. The absorption and scattering cross sections of Lead are close to that of Zirconium (Zr) and hence may not affect the fuel design significantly. Since lead has a very good operating range up to 1600° C., the Zr-water explosion and clad damage in the core and related core accidents may be minimized.

In one implementation, the present system and device has heat dissipating fins. These fins may be detachable heat dissipating fin with variants such as rectangular, circular or spiral fins attached to the liquid metal thermo-siphons from the core.

In one implementation, the heat dissipating fins may be compact, staggered fins for multiple thermo-siphons for addressing the space constraints.

The nuclear reactor core by its nature can traverse from operating temperature to accident temperatures even at its lowest power shut-down condition and hence defines the boundary of cooling requirements to be met for safety, even for the lowest probable beyond design basis events. The present system, device and method addresses both the issues of loss of heat transport by primary coolant, cooling beyond 300° C. and self-contained passive core management at higher temperatures. The loss of heat transport by primary coolant is addressed by a diverse molten metal coolant in the fuel itself and by passive heat transport from the core to the ultimate heat sink, the atmospheric air.

The present invention is effective from 1% decay power to long term. It is independent of primary heat transport system, coolant pressure, and coolant level etc., no external components and no external flow is to be connected to the reactor. Further, the capacity can be extended to 6% decay power by the design of suitable heat sinks and power generation from decay heat. Also, the design capacity is more than 3 days, as long as the core temperature is above the heat sink temperature. Furthermore, the components required are compact hermitically sealed thermo-siphons and fin assemblies, which results in a low density of components in the containment.

An analytical model of the said system was used and calculations were done to establish the efficiency of the said system and device.

Figure 7:
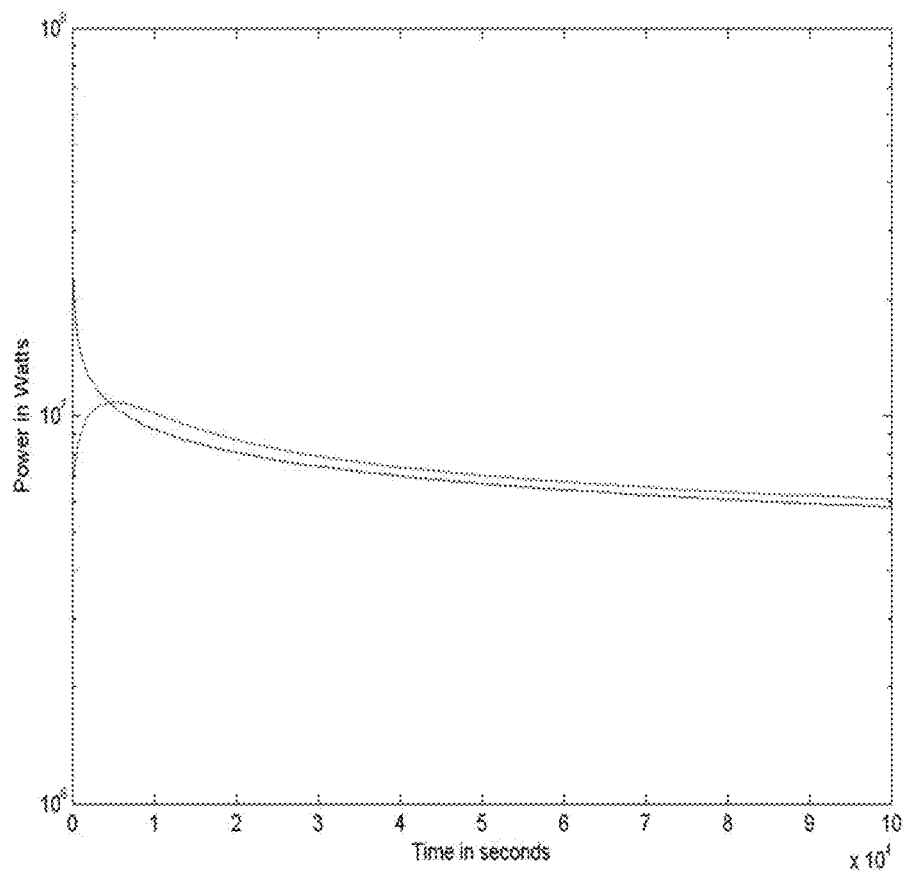
FIG. 7 is a graphical representation of the percentage of decay heat transport by the system, in accordance with an embodiment of the present subject matter.
Figure 8:
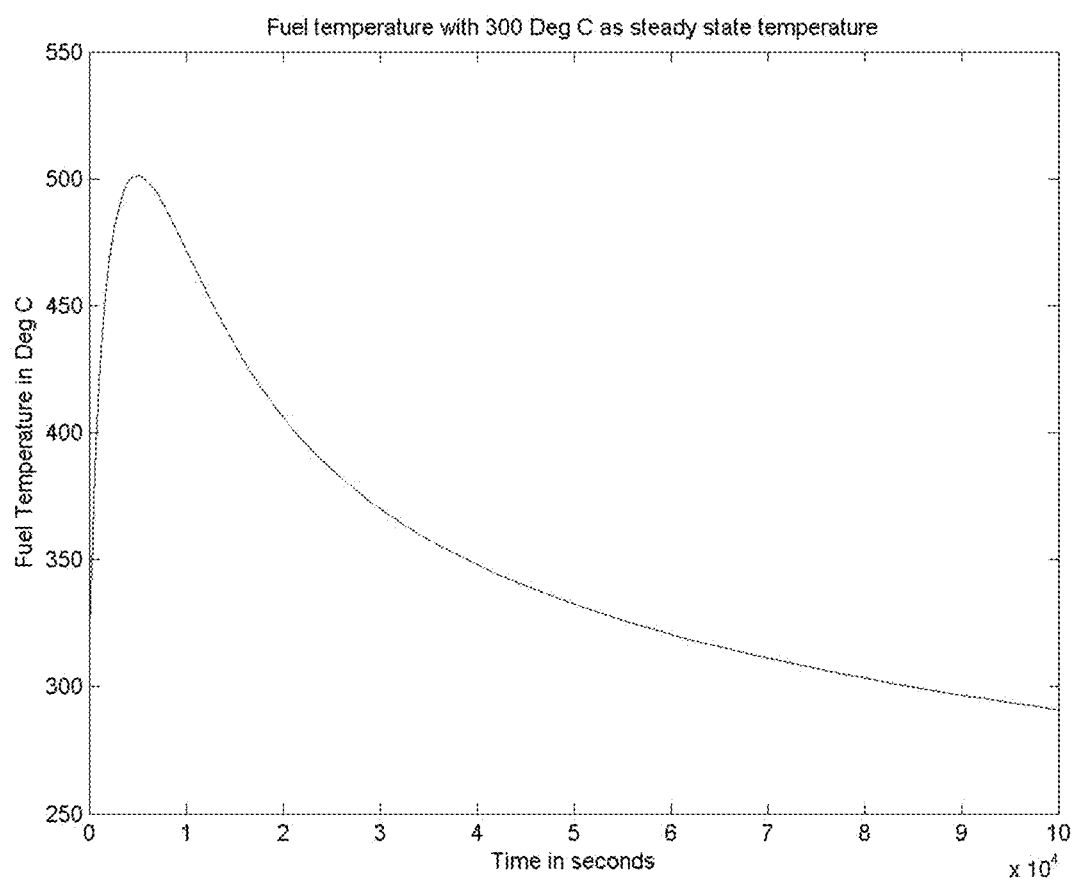
FIG. 8 is a graphical representation of the maximum fuel temperature observed for an embodiment of the present subject matter.

The decay heat and the heat transport by the devices for a 1000 $MW_{th}$ reactor with 450 individual vertical coolant channels is calculated using lumped parameter method and the results are plotted for duration of 100000 seconds after shutdown for the above said configuration. Fuel is assumed to be $UO_2$, clad as Zirconium and shield plug as SS (Stainless Steel), for thermal calculations. The device is effective from 5000 seconds and may be used for decay heat transport of 1% as illustrated in FIG. 7. The maximum fuel temperature observed for this calculated case is nearly 500° C. and is illustrated in FIG. 8. The device is observed to be effective from 5000 seconds after shut down, for a decay heat transport of 1% and the maximum fuel temperature is observed to be 500° C.

Thus, the system provides for decay heat removal, by direct transport of heat from the fuel to the ultimate heat sink (atmospheric air), passively, independent of reactor systems, without any active external input or power. The major advancement of the system is to provide transport decay heat directly from the fuel passively to atmospheric air, instead of decay heat transport from primary coolant. In addition, the radical change in treating the decay heat, as source of power to handle extended Station Black Out situations.

Apart from what is disclosed above, the present invention also include some addition benefits and advantages. Few of the additional benefits are mentioned below:

Passive decay heat transport from the fuel to ultimate heat sink, the atmospheric air without any operator interference or external input.

Capable of un-attended safe operation for prolonged duration.

Independent functionality, irrespective of the availability of primary coolant and other auxiliary systems.

Self-managed passive systems adaptable to existing reactors.

Limits the core temperatures, well below the exothermic Zr-Water reactions leading to hydrogen release and hence eliminating the secondary accidents crippling the access to reactor systems.

Addresses the failure of heat transport by high pressure primary water coolant and the decay heat removal systems attached to the said system, by introducing a diverse low pressure & high temperature liquid metal coolant directly in the fuel.

Redundant thermo-siphons from the core enhance the availability of cooling in the core even in the case of severe accident situations.

Passive accident tolerant spent fuel without dependence on external coolant pool and with no special cooling constraint during handling.

It may be understood by the person skilled in that art that, the method such as transport or transfer of heat by conduction, convection and the like method may be achieved by the existing mechanism/components/elements which may not be considered as the essential part of the present invention, and hence is not explained in detail about the same in the present invention.

The illustrations of arrangements described herein are intended to provide a general understanding of the structure of various embodiments, and they are not intended to serve as a complete description of all the elements and features of device and systems that might make use of the structures described herein. Many other arrangements will be apparent to those of skilled in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description

The invention claimed is:

1. A passive core decay heat transport system for water cooled reactors comprising a device in a reactor core, wherein the device comprises:
   at least one coolant channel containing a fuel assembly;
   at least one collet joint connecting a fuel in the fuel assembly to a shield plug;
   at least one thermo-siphon containing a liquid metal for transporting of decay heat from the fuel;
   at least one other thermo-siphon containing a liquid metal for transport of the decay heat from the at least one thermo-siphon; and
   at least one assembly of heat dissipating fins for transport of the decay heat from the at least one other thermo-siphon to an ultimate heat sink with atmosphere air;
   wherein thermal expansion of the liquid metal in the at least one thermo-siphon and the at least one other thermo-siphon establishes a conductive heat transfer path and a convective heat transfer path and transfers the decay heat from the fuel to the at least one thermo-siphon, and the at least one thermo-siphon transports the decay heat to the at least one other thermo-siphon and then to the at least one assembly of fins, whereby the at least one assembly of fins dissipates the decay heat by natural circulation of air within the passive core decay heat transport system into an atmospheric air.

2. The passive core decay heat transport system for water cooled reactors as claimed in claim 1, wherein the fuel assembly is coupled to at least one lower end fitting connecting the fuel assembly to the coolant channel.

3. The passive core decay heat transport system for water cooled reactors as claimed in claim 1, wherein the shield plug provides shielding from radiation and guides a flow within the at least one coolant channel.

4. The passive core decay heat transport system for water cooled reactors as claimed in claim 1, further comprises at least one seal plug coupled to the at least one collet joint for pressure sealing a water coolant.

5. The passive core decay heat transport system for water cooled reactors as claimed in claim 1, wherein the at least one assembly of heat dissipating fins comprises:
   an isolation enclosure in a reactor closure deck;
   a flow guide;
   at least one inlet duct connected to the at least one assembly of fins;
   at least one outlet duct;
   a means to connect to a containment; and
   at least one air cooling duct surrounding the containment for cooling hot air from the at least one assembly of fins;
   wherein the conductive heat transport path and the convective heat transport path are activated by the melting of a metal to create the liquid metal, which transfers the decay heat to the ultimate heat sink in closed circuit, through the conductive heat transport path and the convective heat transport path the at least one assembly of heat dissipating fins, the flow guide, the inlet duct, the outlet duct, the containment, and the cooling duct; and
   wherein the at least one assembly of heat dissipating fins communicated with external air for cleansing and initiating the passive core decay heat transport system.

6. The passive core decay heat transport system for water cooled reactors as claimed in claim 1, wherein the at least one assembly of heat dissipating fins may have either of a rectangular, a circular or a spiral configuration.

7. The passive core decay heat transport system for water cooled reactors as claimed in claim 1, wherein the at least one assembly of heat dissipating may be detachable or compact staggered.

8. The passive core decay heat transport system for water cooled reactors as claimed in claim 1, wherein the at least one assembly of heat dissipating fins are made of a material suitable for an operating temperature of about 300° C. or more.

9. The passive core decay heat transport system for water cooled reactors as claimed in claim 1, wherein a metal coolant of lead is adapted to pass the decay heat from the reactor core to the ultimate heat sink.

10. A method for passive core decay heat transport in the passive core decay heat transport system for water cooled reactors of claim 1 comprising:
   i. melting of metal due to rise in temperature of the fuel above the melting point of the metal;
   ii. activation of the conductive heat transport path and the convective heat transport path due to the melting of the metal;
   iii. transfer of the decay heat by the conduction heat transfer path and the convective heat transfer path between the fuel assembly, the at least one thermo-siphon and the at least one other thermo-siphon;
   iv. transfer of the decay heat from the at least one other thermo-siphon to the at least one assembly of heat dissipating fins; and
   v. transfer of the decay heat by the air from the at least one assembly of heat dissipating fins to the ultimate heat sink.

11. The method for passive core decay heat transport for water cooled reactors as claimed in claim 10, wherein the metal is lead.

12. The method for passive core decay heat transport for water cooled reactors as claimed in claim 10, wherein a metal coolant passes the decay heat from the fuel to the ultimate heat sink.

13. The method for passive core decay heat transport for water cooled reactors as claimed in claim 10, wherein the method is operated passively.

14. A passive core decay heat transport device for water cooled reactors comprising:
   at least one lower end fitting coupled to a fuel assembly producing heat;
   at least one coolant channel containing the fuel assembly surrounded by primary water coolant to cool a fuel within the fuel assembly;
   at least one thermo-siphon containing liquid metal for transport of the heat;
   at least one shield plug for radiation shielding and guiding a flow within the at least one coolant channel;
   at least one collet joint connecting the fuel in fuel assembly to the shield plug;
   at least one other thermo-siphon containing liquid metal for transport of the heat; and
   at least one seal plug coupled to at least one assembly of heat dissipating fins, wherein the at least one seal plug comprises at least one of the at least one collet joints coupled to the at least one other thermo-siphon;
   wherein the fuel assembly transfers the heat to the at least one thermo-siphon using a conductive heat transfer mode and a convective heat transfer mode, and the at least one thermo-siphon transfers the heat to the at least one other thermo-siphon and then to the at least one assembly of fins, which results in cooling of the reactor core by natural circulation of air in closed circuit within the passive core decay heat transport device into an atmospheric air.

* * * * *

UNITED STATES PATENT AND TRADEMARK OFFICE
CERTIFICATE OF CORRECTION

PATENT NO. : 10,607,740 B2
APPLICATION NO. : 15/517077
DATED : March 31, 2020
INVENTOR(S) : Aparna Janardhanan et al.

Page 1 of 1

It is certified that error appears in the above-identified patent and that said Letters Patent is hereby corrected as shown below:

In the Claims

Column 11, Line 3 insert --fins-- after the phrase "assembly of heat dissipating"

Signed and Sealed this
Twenty-third Day of June, 2020

Andrei Iancu
*Director of the United States Patent and Trademark Office*